Figure 1:
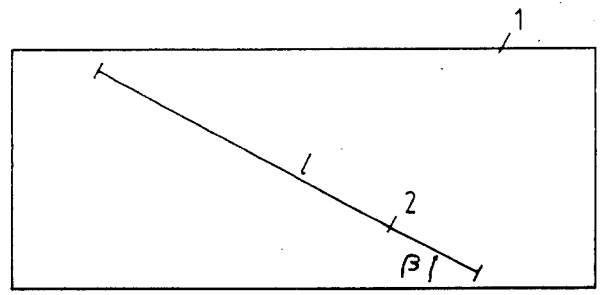

United States Patent [19]
Heitmann

[11] Patent Number: 4,513,328
[45] Date of Patent: Apr. 23, 1985

[54] METHOD OF RECORDING VIDEO SIGNALS WITHIN A PREDETERMINED BIT/UNIT TIME RECORDING RATE

[75] Inventor: Jürgen Heitmann, Alsbach-Hähnlein, Fed. Rep. of Germany

[73] Assignee: Robert Bosch GmbH, Stuttgart, Fed. Rep. of Germany

[21] Appl. No.: 352,009

[22] Filed: Feb. 24, 1982

[30] Foreign Application Priority Data

Feb. 28, 1981 [DE] Fed. Rep. of Germany ....... 3107733

[51] Int. Cl.$^3$ .................. G11B 5/00; G11B 15/02
[52] U.S. Cl. ........................................ 360/8; 360/22
[58] Field of Search ....................... 360/8, 9, 36, 22

[56] References Cited
U.S. PATENT DOCUMENTS 4,222,078  9/1980  Bock ................................ 360/9.1
4,394,686  7/1983  Horstmann ..................... 360/36.1

Primary Examiner—Vincent P. Canney
Attorney, Agent, or Firm—Frishauf, Holtz, Goodman & Woodward

[57] ABSTRACT

Digital data are stored on a magnetic tape at a bit rate which does not exceed the storage capabilities of the tape of about 80 Mbit/s, although received digital video signals have a bit rate of about 100 Mbit/s per channel in a two-channel system. In order to record such a bit-stream, the signals are applied to a head wheel having at least three transducer heads, and the bits are applied to the transducer heads in time-expanded form, the time-expanded signals being recompressed upon reproduction. Time compression and expansion is preferably carried out by buffer memories which have data entered and read-out in the FIFO method, at respectively different clock rates, switched under control of a control unit (24) which receives head wheel position input signal information.

16 Claims, 5 Drawing Figures

METHOD OF RECORDING VIDEO SIGNALS WITHIN A PREDETERMINED BIT/UNIT TIME RECORDING RATE

The present invention relates to the recording of digitally encoded video data on a recording medium such as magnetic tape, in which a head wheel rotates in a gap of a recording cylinder about which the tape is guided in a helical path, so that recorded tracks which are inclined with respect to the major axis of the tape will be formed thereon.

BACKGROUND

Various types of helical scan recording systems and methods are known, in which the tape is looped about a recording cylinder or drum with a looping angle of about 180°. The digitized video signal is distributed to a plurality of channels and is recorded with several magnetic heads on adjacent magnetic tracks. The technical effort—such as magnetic heads, amplifiers, rotating transformers—rises with the number of channels. Thus, to keep the number of recording heads and thus the construction of the recording transducer unit reasonably simple, the number of channels should be as low as possible. A suitable number is two channels, which is most desirable.

Data rates of digital video signals may be in the order of 200 megabits per second (200 Mbit/s); this means that the data rate of 100 Mbit/s per channel will be needed, which means a band width of about 50 MHz. Currently used recording speeds, however, cause an unacceptable increase in wear of the head, wear on tapes, and in the error rate if a recording rate of about 80 Mbit/s is exceeded.

THE INVENTION

It is an object to provide a method of recording a signal of 100 Mbit/s per channel with acceptable error rates, without recording, within one channel, at a rate of 80 Mbit/s.

Briefly, the signals are time-transformed in the recording/reproduction process; specifically, prior to recording the signals are time-expanded; upon reproduction, the signals are time-compressed.

The method and system has the advantage that the entire stream of data can be subdivided on two demultiplex channels, while yet permitting recording in any one channel at a rate of data transfer, per unit time, which is acceptable, and then correcting for the expanded rate by time compression upon reproduction. Further the head-to-tape speed is reduced providing longer head life-time.

DRAWINGS

Figure 2A:
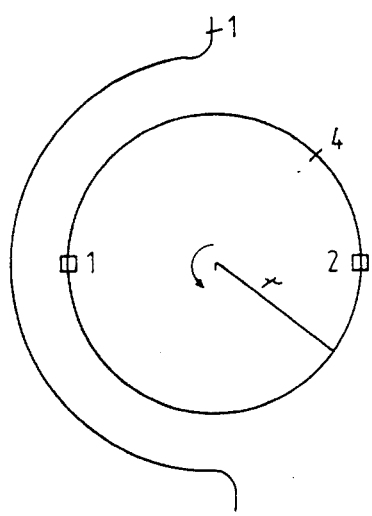
Figure 2B:
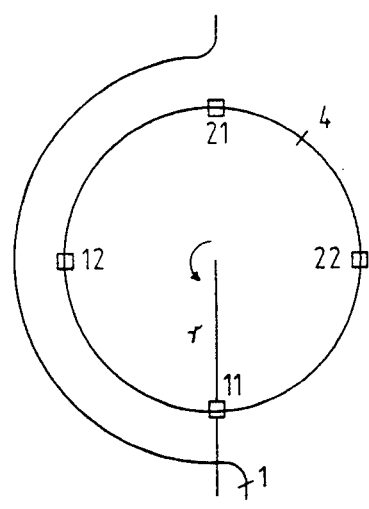
Figure 3:
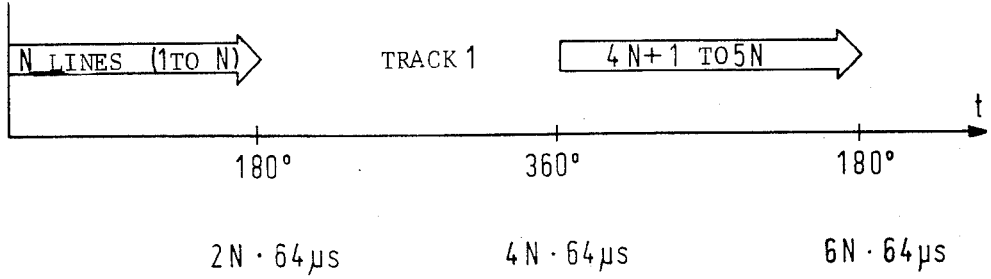
Figure 3:
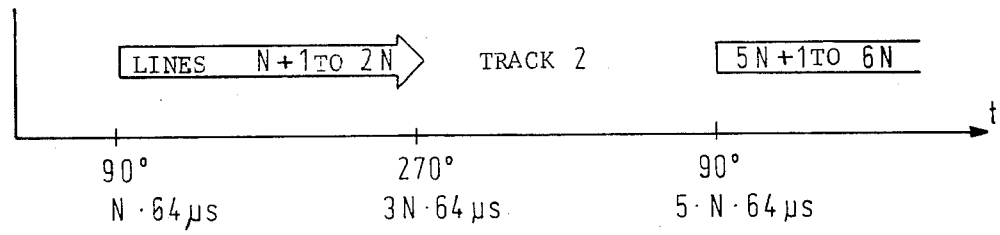
Figure 3:
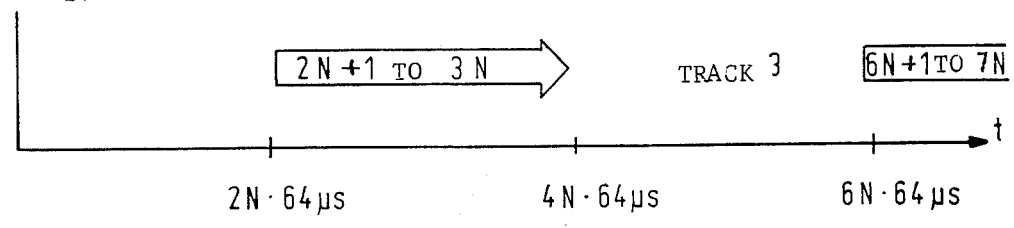
Figure 3:
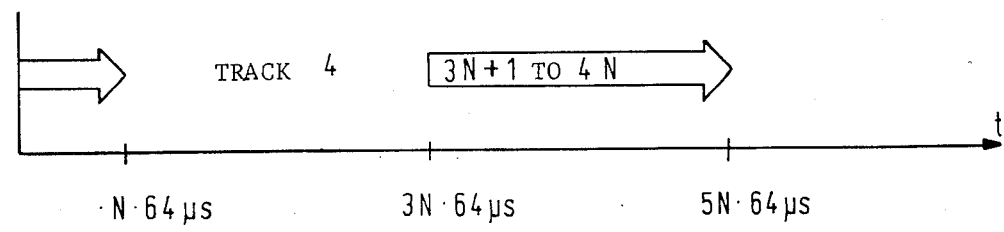
Figure 4:
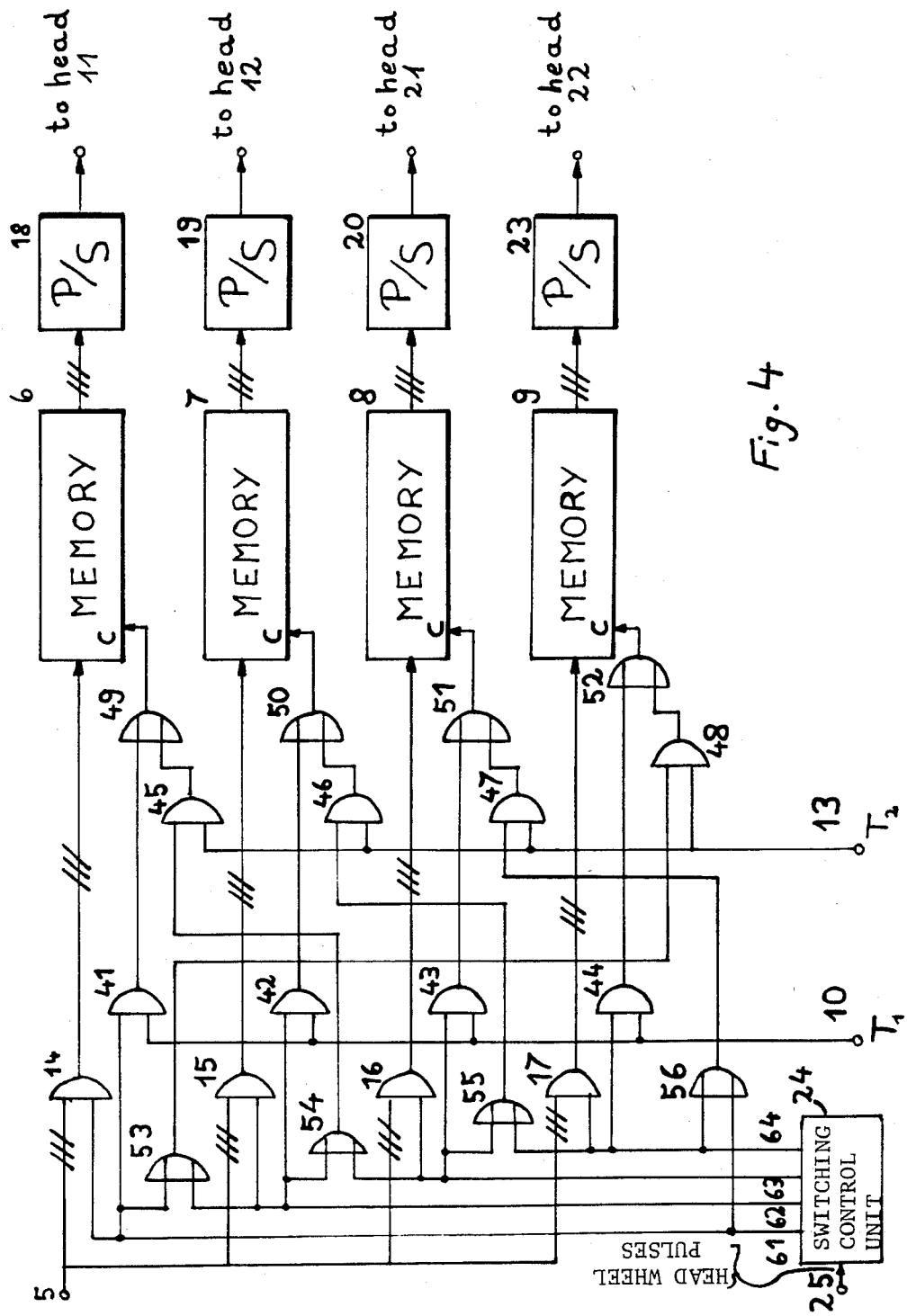

FIG. 1 is a schematic representation of recorded track on magnetic tape,

FIG. 2, consisting of FIGS. 2a and 2b, is a highly schematic view of a head wheel, and the tape looped thereabout used in accordance with the prior art and the present invention, FIG. 3, in graphs a to d, is a series of time diagrams illustrating the signals being recorded in accordance with the present invention and FIG. 4 is a schematic circuit diagram of a time transformation circuit.

As illustrated in FIG. 1, a magnetic tape 1 is looped about a head wheel carrier or recording cylinder or recording drum, so that a recording track 2 will be formed thereon, having a length L, and extending at an angle $\beta$ with respect to the longitudinal edge of the tape. In accordance with the invention, the same quantity of data will have more time for recording available to it. As will be explained in detail in connection with FIGS. 2 and 3, the head wheel is operated at half of the speed normally used. The angle changes therefore slightly. This can be disregarded in the further considerations. The reduced speed, which occurs during the transition of the head along the whole track with the known recording methods, already occurs during the first half of the track.

A known recording head wheel is shown in FIG. 2a; a magnetic tape 1 is looped about a head wheel by an angle of 180°. Magnetic heads 11 and 12 are located at the circumference of the head wheel 4. The arrangement of FIG. 2a permits recording of analogue and digital data in one channel. This is well known, for example, in magnetic recording apparatus for recording analog video signals in accordance with the B-standard. In case of several channels the number of heads is multiplied accordingly.

All elements of the magnetic recording apparatus not necessary for an understanding of the present invention have been omitted. Such elements are well known in the art, and include, for example, tape guide arrangements, further components of the scanning apparatus, an upper and a lower scanning drum, head wheel motors, rotary transducers, and the like; they all may be contructed in accordance with well known technology and as described in the literature.

FIG. 2b shows a head wheel 4 according to the present invention based on single-channel recording. Four magnetic heads 11;12;21;22 are arranged at the circumference of the wheel spaced by an angle of 90° each.

In accordance with a feature of the invention, the digital information applied to the magnetic heads in a single channel mode is time-expanded on the tracks in such a manner that the expanded information is distributed over and covers the whole length of the track. The temporal relationships are best seen in FIG. 3, in which the time axis-abscissa corresponds to the angular position of the head wheel, and the respective time is entered. N defines that number of video lines which are recorded on any one track. The time indication of 64 microseconds is referenced to the CCIR standard. A corresponding time duration can be used for other television standards.

Heads 11 and 21 form the tracks 31;33;35 . . . which are recorded, alternatingly, with head 11 and head 21 for the time 2N·64 microseconds. Due to the above referred-to time expansion, recording is effected not up to a head wheel position of 90°, but rather 180°. Head 11 records TV lines 1 to N, that is, N lines, at the next rotation of the head wheel, head 11 records line 4N+1 to 5N.

The head 21 starts one-half head wheel rotation later to record the lines 2N+1 to 3N; at the next head wheel rotation it starts at line 6N+1.

The tracks 32;34;36 . . . are recorded by the head wheels 12 and 22.

These signals are time-expanded, too and distributed to the heads 12 and 22. Head 12 records signals of TV lines N+1 to 2N during a first revolution and lines 5N+1 to 6N during a second revolution. Recording of head 22 is illustrated in FIG. 3 for one revolution only relating to lines 3N+1 to 4N.

A suitable time transformation system to carry out the method of the present invention is shown in FIG. 4.

The signals to be recorded are connected to an input terminal 5. Four memories, 6;7;8;9 are provided which receive the signals through the and-gates 14;15;16;17. Additionally, the memories 6;7;8;9 receive clock signals T1, T2 which are applied to the inputs 10;13 and conducted to the clock inputs of the memories by gating means 41–55.

Further, the system shown in FIG. 4 comprises a timing control unit 24 which is controlled at terminal 25 by a pulse occuring at every quarter revolution of the head wheel. This pulse is well known in the art in connection with four-head video tape recorders and is called head switching pulse. The timing control unit 24 comprises generally a ring counter being operated in a manner that among four outputs 61;62;63;64 of the timing unit only one at a time shows a logical one changing from one quarter revolution of the head wheel to the other.

The input signals may be applied to the input terminal 5 in a parallel form. In such case the conductors and gate circuits between the input and the memories 6;7;8;9 and the memories themselves, too, would be prepared to deal with the respective number of parallel signals, e.g. eight as commonly used in digital TV techniques. In this case the output signals of the memories are converted into serial signals by parallel serial converters 18;19;20;23. The outputs of these converters are connected to the heads 11;12;21;22.

The function of the system according to FIG. 4 is now explained in connection with the timing diagram of FIG. 3. During the time interval from 0° to 90° or N·64 μs the input signals are conducted to memory 7 and are written-in to this memory with clock T1 preferably corresponding to the clock rate of the received digital signal. N is the number of TV lines to be recorded by one half revolution of the head wheel but occuring during the time of a quarter revolution. To enable the storage of these signals during the above named time, the timing unit 24 delivers a logical one through its output 62. Therefore, AND-gate 15 is conductive delivering the input signals to the input of the memory 7. During the same time the clock pulses T1 are supplied from input connector 10 via AND-gate 42 which receives the logical one from the output 62 and via OR-gate 50 to the clock input C of memory 7. Further during the first quarter revolution signals stored previously in memory 6 are read-out of memory 6. The head wheel operates at full speed—with respect to normal speed, and thus the clock frequency T2 is made half of the frequency of the clock T1. In the present embodiment, clock T2 is applied to the clock input of memory 6 as follows: As shown in the upper line of FIG. 3, the lines 1 to N are recorded by head 11 during two quarter revolutions. Therefore, the outputs 62;63 of the timing unit 24 are combined by an OR-gate 54. Therefore, AND-gate 45 becomes conductive for the clock T2 during the presence of a logical ONE either at output 62 or output 53, that is, during the half revolution of the head wheel.

During the time between the 90° and the 270° position of the head wheel logical ones appear at the outputs 63;64; they are combined by OR-gate 55, and cause the AND-gate 46 to conduct clock pulses T2 via the OR-gate 50 to the clock input of memory 7. During this time period the signals stored in memory 7 are read-out and transferred via the parallel-to-serial converter to head 12.

During the following invervals the memories 8;9 as well as again memories 6;7 are loaded and emptied in a similar way.

Various changes and modifications may be made, and the particular instrumentation illustrated in FIG. 4 is only one example, which is particularly suitable, and preferred, to obtain time transformation. Memories 6;7;8;9 may be shift registers or memories of the first-in, first-out (FIFO) type; such memories are available as integrated circuits for example the Texas Instrument 74SN225N.

Time compression of signals, upon reproduction, can be effected by a structure almost identical to that of FIG. 4, in which only the inputs and outputs as well as the clock frequencies applied to terminals 10 and 13 have to be interchanged.

The time transformation ratio is not limited to an integer number. At a reduction of the number of revolutions of the head wheel by the factor 0.66, i.e. a speed change of the head wheel with respect to normal scanning speed to ⅔ slower, and an increase of the number of heads on the head wheel from 2 to 3 for example, the time transformation ratio is 1.5.

I claim:

1. Method of transducing digital video signals to a magnetic tape (1), in which the digital signals are received at an input (5) at a predetermined bit rate, which may exceed the bit/unit time recording rate for recording of signals on the tape, in which the tape (1) is passed in a helical path about the transducer scanning drum having a rotating head wheel (4) with at least three transducer heads (11, 12, 21, 22), spaced equally apart, which transduce signals on inclined tracks on the tape, comprising the steps of receiving the digital signal at its predetermined bit rate;

storing the digital signals at said predetermined bit rate;

reading-out the stored digital signals at said bit rate times the ratio of the angular spacing of the transducer heads to 180° to transform the video signals into time-expanded signals;

switching the signals being read-out to respective transducer heads then in contact with the tape;

and recording the signals being read-out on the tape.

2. Method according to claim 1, including the steps of subdividing the digital signals into sections, each one of which corresponds to the time of a revolution of a head wheel divided by the number of transducer heads.

3. Method according to claim 1, wherein four transducer heads are provided, wherein the step of reading-out the stored signals is carried out at half said predetermined bit rate.

4. Video tape transducing system for transducing digital video signals being received at a predetermined bit rate to a magnetic tape (4) without exceeding a predetermined bit/unit time recording rate, carrying out the method of claim 1 in which the tape is passed in a helical path about a transducer scanning drum at an angle of 180°, said drum having a rotational head wheel (4) comprising at least three transducing heads (11, 21; 12, 22) which transduce signals on inclined tracks (2) located on the head wheel;

a time transformation system (6–9; 10; 13–14–19), connected to receive said video signals at said predetermined bit rate, including clock means (10, 13) providing clock signals (T1, T2) at respectively different clock rates;

means (14, 15, 16, 17) for controlling application of said signals at said predetermined bit rate to the time transformation system under control of one of said clock rates, and for retrieval of said signals at the predetermined bit/unit recording rate;

and means (18–23) for connecting the time transformation system to respective ones of the transducer heads for recording on said tape at said predetermined bit/unit time recording rate.

5. System according to claim 4, wherein said time transformation system comprises a memory array (6–9) and said means (14–17) for controlling application of said signals at said predetermined clock rate comprises switching means controlling recording of said signals in the respective memory portions of said memory array, and retrieval of signals at the predetermined bit/unit time recording rate and connection to said connecting means (18–23).

6. System according to claim 5, wherein said memory array is switched in accordance with first-in-first-out sequencing at the respectively different clock rates.

7. System according to claim 4, wherein the clock rates of said clock signals (T1, T2) are related by the ratio of 180° to the angular spacing of the transducer heads on the head wheel.

8. System according to claim 5, wherein four transducer heads are provided;

and the signals are recorded in the memory at a first clock rate (T1) corresponding to said bit rate, retrieved, and applied to said connecting means at a clock rate (T2) of half said first clock rate.

9. Method of reproducing digital video signals which are recorded on inclined tracks in time-expanded form on an elongated tape to obtain time-compressed signals at a predetermined bit rate which may exceed the bit/unit time recording rate of the signals recorded on the tape, in which the tape is passed in a helical path about the transducer scanning drum having a rotating head wheel with at least three transducer heads, which transduce the signals on the inclined tracks on the tape, comprising the steps of reading out the signals from the tape by said transducer heads;

switching the signals being read-out from the respective transducer heads to obtain the signals from the heads then in contact with the tape to a storage memory;

storing the digital signals transduced from the respective transducer heads then in contact with the tape in the memory at the bit/unit time recording rate of the signals on the tape;

and retrieving said stored digital signal at the bit rate of the read-out signal times the ratio of 180° to the angular spacing of the transducer heads on the head wheel.

10. Method according to claim 9, including the steps of subdividing the digital signals into sections, each one of which corresponds to the time of a revolution of a head wheel divided by the number of transducer heads.

11. Method according to claim 9, wherein four transducer heads are provided, wherein the step of retrieving the stored signals is carried out at twice the bit rate of the signals stored in the memory.

12. Video tape transducing system for transducing digital video signals recorded at a predetermined bit/unit time rate on a magnetic tape (4) to signals at a higher and predetermined bit rate, carrying out the method of claim 9 in which the tape is passed in a helical path about a transducer scanning drum at an angle of 180°, said drum having a rotating head wheel (4) comprising at least three transducing heads (11, 21; 12, 22) which transduce digital signals on inclined tracks (2) located on the head wheel;

a time transformation system (6–9; 10; 13–14 ∝ 19), connected to receive said transduced signals at the recorded predetermined bit rate, including clock means (10, 13) providing clock signals (T1, T2) at respectively different clock rates;

means (18–23) for connecting respective transducer heads to the time transformation system for receiving signals from said tape at the recorded bit/unit time rate;

and means (14, 15, 16, 17) for controlling application of said received signals at said recorded bit rate to the time transformation system under control of one of said clock rates (T2), and for retrieval of said received signals at a predetermined bit video signal clock rate (T1).

13. System according to claim 12, wherein said time transformation system comprises a memory array (6–9) and said means (14–17) for controlling application of said received signals at said predetermined bit/unit time clock rate comprises switching means controlling recording of said received signals in respective memory portions of said memory array, and retrieval of signals at the predetermined bit video signal rate, said memory array receiving the received signals from said connecting means (18–23).

14. System according to claim 13, wherein said memory array is switched in accordance with first-in-first-out sequencing at the respectively different clock rates.

15. System according to claim 2, wherein the clock rates of said clock signals (T1, T2) are related by the ratio of 180° to the angular spacing of the transducer heads on the head wheel.

16. System according to claim 13, wherein four transducing heads are provided;

and the signals received in the memory are stored at a clock rate (T2) which is half of the video signal clock rate (T1).

* * * * *

UNITED STATES PATENT AND TRADEMARK OFFICE
CERTIFICATE OF CORRECTION

PATENT NO. : 4,513,328
DATED : April 23, 1985
INVENTOR(S) : Jurgen HEITMANN

It is certified that error appears in the above-identified patent and that said Letters Patent is hereby corrected as shown below:

Claim 15 (column 6, line 51) change "claim 2" to -- claim 12 -- column 3, line 59, change "output 53" to -- output 63 --

Claim 12, column 6, line 23, change "14 ∝ 19." to -- 14 - 19 --

Signed and Sealed this

Twenty-fourth Day of September 1985

[SEAL]

Attest:

DONALD J. QUIGG

Attesting Officer

Commissioner of Patents and
Trademarks—Designate